(12) United States Patent
Tanahashi

(10) Patent No.: US 8,172,225 B2
(45) Date of Patent: May 8, 2012

(54) FEEDING DEVICE AND IMAGE RECORDING APPARATUS WITH THE FEEDING DEVICE

(75) Inventor: Naokazu Tanahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 26 days.

(21) Appl. No.: 12/718,782

(22) Filed: Mar. 5, 2010

(65) Prior Publication Data

US 2010/0225050 A1    Sep. 9, 2010

(30) Foreign Application Priority Data

Mar. 6, 2009  (JP) .................................. 2009-054244

(51) Int. Cl.
*B65H 5/00* (2006.01)
*B65H 29/00* (2006.01)

(52) U.S. Cl. ........ 271/225; 271/186; 271/184; 271/902; 271/303

(58) Field of Classification Search ................... 271/225, 271/186, 184, 902, 303, 242
See application file for complete search history.

(56) References Cited

U.S. PATENT DOCUMENTS

| 4,956,678 A * | 9/1990 | Kiya et al. ..................... 399/401 |
| 2005/0046686 A1 | 3/2005 | Iwakura et al. |
| 2007/0122225 A1 | 5/2007 | Izuchi et al. |
| 2010/0207321 A1 * | 8/2010 | Samoto et al. ................ 271/225 |

* cited by examiner

*Primary Examiner* — Michael McCullough
*Assistant Examiner* — Luis A Gonzalez
(74) *Attorney, Agent, or Firm* — Baker Botts L.L.P.

(57) ABSTRACT

A feeding device has a conveying roller that rotates in a forward direction and a reverse direction, to selectively convey a sheet in a conveying direction and a reverse conveying direction. A particular guide member is positioned on an upstream side, guides the conveyed sheet toward the conveying roller, and has a stopper that contacts an end portion of the sheet, thereby stopping movement of the sheet in the reverse conveying direction. A control unit causes the conveying roller to rotate the conveying roller in the forward direction, such that the sheet is conveyed to a predetermined position, then to rotate the conveying roller in the reverse direction, wherein the end portion of the sheet contacts the stopper while the conveying roller rotates in the reverse direction, and then to again rotate the conveying roller in the forward direction, such that the sheet is conveyed toward the conveying roller.

19 Claims, 13 Drawing Sheets

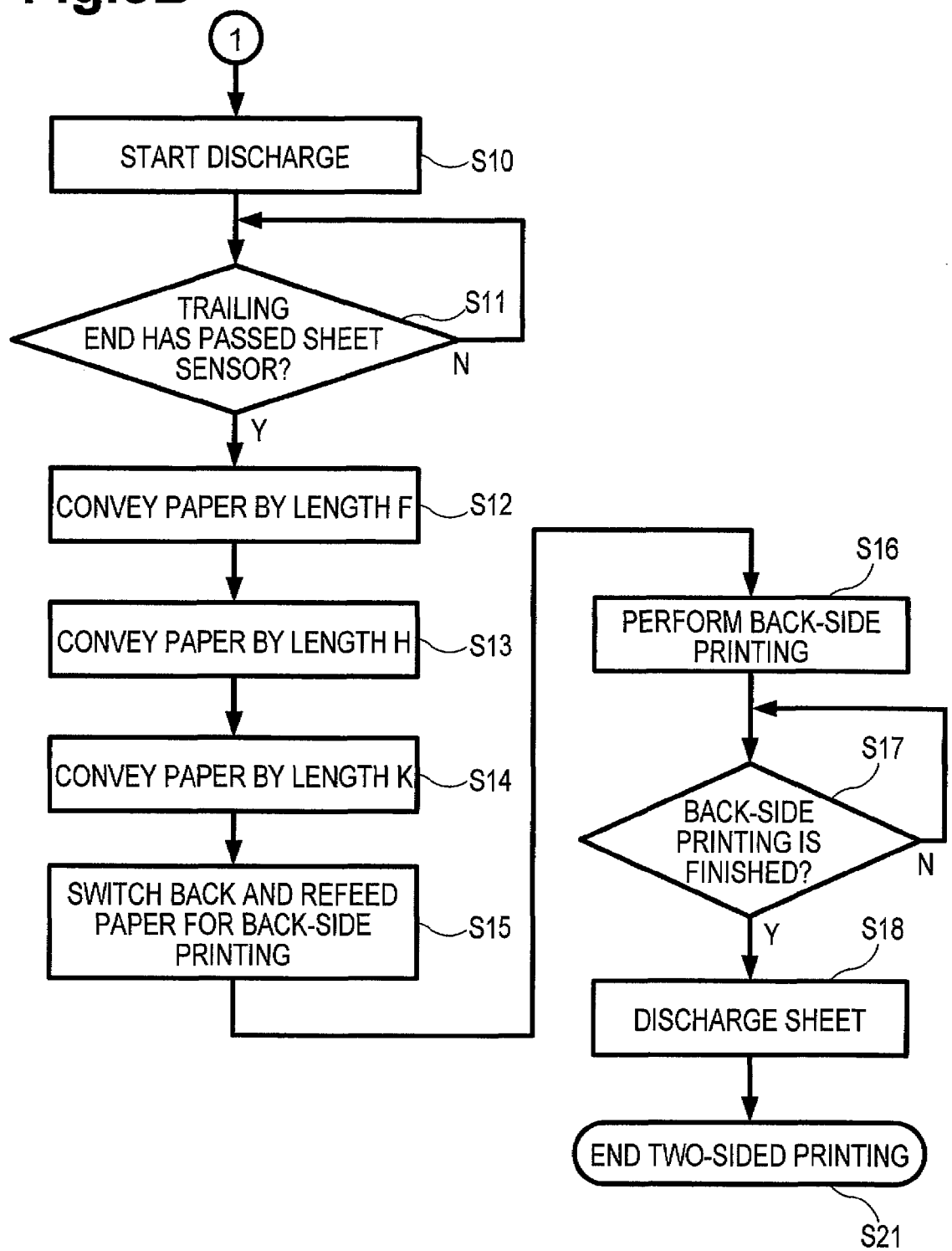

FEEDING DEVICE AND IMAGE RECORDING APPARATUS WITH THE FEEDING DEVICE

CROSS REFERENCE TO RELATED APPLICATION

The present application claims priority from Japanese Patent Application No. 2009-054244, which was filed on Mar. 6, 2009, the disclosure of which is incorporated herein by reference in its entirety.

BACKGROUND OF THE INVENTION

1. Field of the Invention

The present invention relates to a feeding device and an image recording apparatus having a mechanism for sending a sheet.

2. Description of the Related Art

Conventionally, feeding devices capable of switching the traveling direction of the sheet and returning the sheet to a conveying path are known. Such a feeding device has a problem in that an end of the sheet that is switched and returned tends to curl.

To solve this problem, feeding devices which prevent the sheet from curling by employing a configuration in which a plurality of conveying rollers each positioned in a comb-like arrangement press and convey the sheet are known. In such a feeding device, when the sheet is conveyed, the sheet sometimes may be wholly deformed with wavy irregularities in the width direction thereof, especially in an end portion of the sheet.

SUMMARY OF THE INVENTION

It is an object of the present invention to provide a feeding device and an image recording apparatus with the feeding device, which are capable of arranging the shape of the end portion of the sheet into the more desirable shape.

In an embodiment of the invention, a feeding device comprises a conveying roller configured to selectively rotate in a forward direction and a reverse direction, the conveying roller configured selectively to convey a sheet toward a downstream side in a conveying direction when the conveying roller is rotated in the forward direction, and to convey the sheet in a reverse conveying direction opposite the conveying direction when the conveying roller is rotated in the reverse direction, a particular guide member positioned on an upstream side of the conveying roller in the conveying direction and configured to guide the conveyed sheet toward the conveying roller, the particular guide member comprising a stopper configured to contact an end portion of the sheet when the sheet is conveyed in the reverse conveying direction by the reverse rotation of the conveying roller, thereby stopping movement of the sheet in the reverse conveying direction when the end portion of the sheet contacts the stopper, and a control unit. The control unit is configured to control the conveying roller to rotate the conveying roller in the forward direction, such that the sheet is conveyed in the conveying direction to a predetermined position, rotate the conveying roller in the reverse direction, after the sheet has been conveyed to the predetermined position, such that the sheet is conveyed a predetermined amount in the reverse conveying direction, wherein the end portion of the sheet contacts the stopper while the conveying roller rotates in the reverse direction, and after rotating the conveying roller in the forward direction and in the reverse direction, to again rotate the conveying roller in the forward direction, such that the sheet is conveyed toward the conveying roller.

In another embodiment of the invention, an image recording apparatus comprises a recording unit configured to record an image on a recording medium, and a feeding device. The feeding device comprises a conveying roller configured to selectively rotate in a forward direction and a reverse direction, the conveying roller configured selectively to convey a sheet toward a downstream side in a conveying direction when the conveying roller is rotated in the forward direction, and to convey the sheet in a reverse conveying direction opposite the conveying direction when the conveying roller is rotated in the reverse direction, a particular guide member positioned on an upstream side of the conveying roller in the conveying direction and configured to guide the conveyed sheet toward the conveying roller, the particular guide member comprising a stopper configured to contact an end portion of the sheet when the sheet is conveyed in the reverse conveying direction by the reverse rotation of the conveying roller, thereby stopping movement of the sheet in the reverse conveying direction when the end portion of the sheet contacts the stopper, and a control unit. The control unit is configured to control the conveying roller to rotate the conveying roller in the forward direction, such that the sheet is conveyed in the conveying direction to a predetermined position, rotate the conveying roller in the reverse direction, after the sheet has been conveyed to the predetermined position, such that the sheet is conveyed a predetermined amount in the reverse conveying direction, wherein the end portion of the sheet contacts the stopper while the conveying roller rotates in the reverse direction, and after rotating the conveying roller in the forward direction and in the reverse direction, to again rotate the conveying roller in the forward direction, such that the sheet is conveyed toward the conveying roller Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

FIGS. 8A and 8B are a flowchart of a two-sided image recording operation performed by the printer unit of the multifunction device according to the embodiment of the present invention.

DESCRIPTION OF THE PREFERRED EMBODIMENTS

Figure 1:
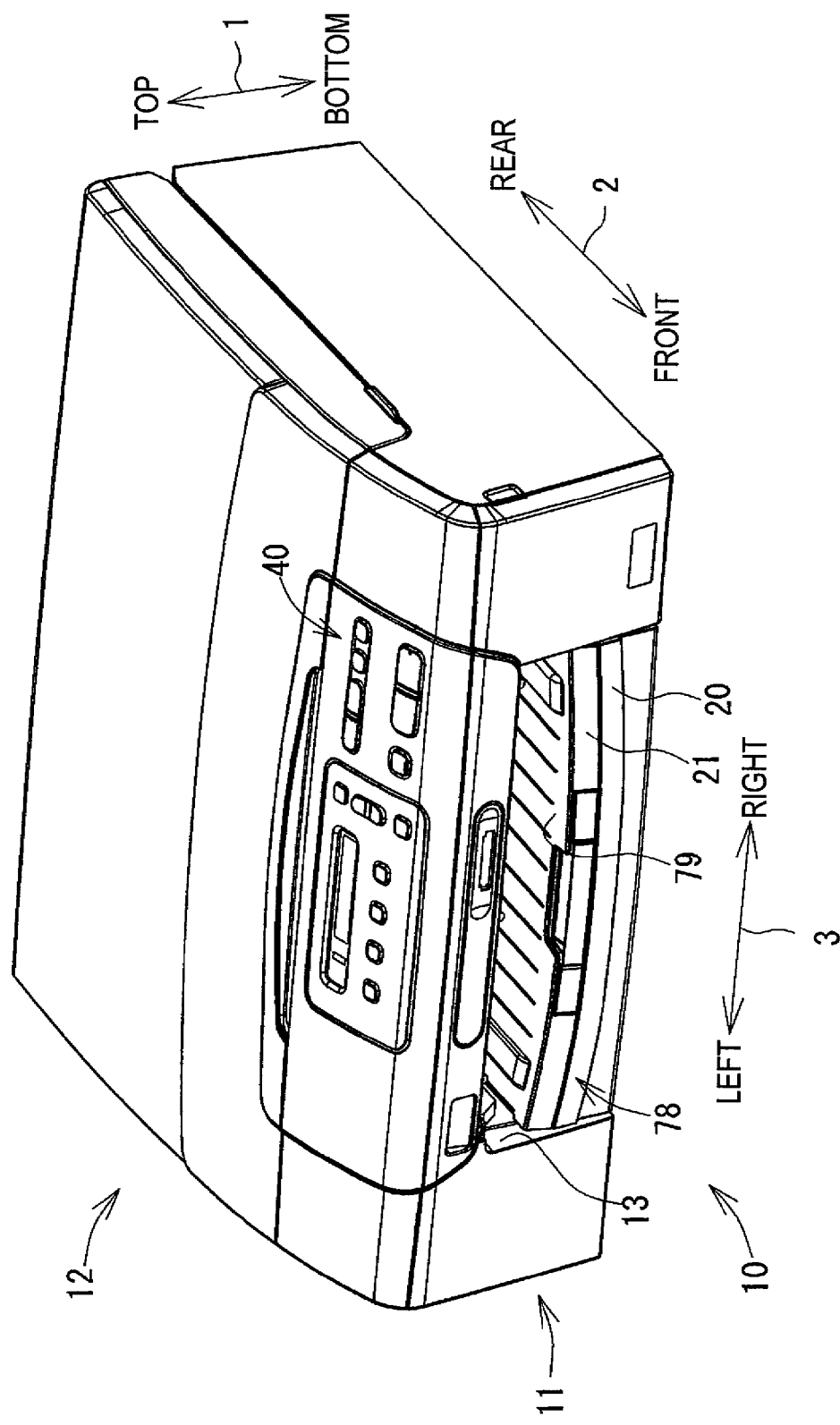
FIG. 1 is an external perspective view of a multifunction device according to an embodiment of the present invention.

Referring to the drawings, preferred embodiments of the present invention will be described below. Note that the embodiments described below are merely examples of the present invention, and the embodiments of the present invention can of course be modified within the scope not changing the gist of the present invention.

[Outline of the Multifunction Device]

FIG. 1 is a perspective view showing the exterior of a multifunction device 10 according to an embodiment of the present invention. In the following description, a top-bottom direction 1 is defined based on a state in which the multifunction device 10 is installed in a usable state (the state shown in FIG. 1), a front-rear direction 2 is defined such that the side having an operation panel 40 is the near side (front), and a left-right direction 3 is defined by viewing the multifunction device 10 from the near side (front).

The multifunction device 10 has a substantially thin rectangular parallelepiped shape, having larger transverse width (the width in the left-right direction 3) and depth (the length in the front-rear direction 2) than height (the top-bottom direction 1). The multifunction device 10 mainly includes a printer unit 11 employing an ink jet recording method and positioned at the lower part, a scanner unit 12 positioned at the upper part, and the operation panel 40 positioned at the front of the top surface. The multifunction device 10 has various functions including a facsimile function, a printer function, a scanner function, and a copier function. The printer unit 11 includes a duplex image recording function for recording images on both sides, i.e., a top surface (a first surface) and a back surface (a second surface), of the recording sheet. Because the functions other than the printer function are arbitrary, the image recording apparatus of the present invention may be embodied as, for example, a printer not having a scanner function, a copier function, or a facsimile function, but having only a printer function.

The printer unit 11 has an opening 13 in the front thereof, through which a sheet-feed cassette 78 is inserted and fitted into the printer unit 11. The sheet-feed cassette 78 can be inserted into and removed from the printer unit 11 in the front-rear direction 2 through the opening 13. The sheet-feed cassette 78 can accommodate recording sheets (an example of a "sheet" according to the present invention) of various sizes and includes a main tray 20 at the bottom and a second tray 21 at the top. That is, the second tray 21 is stacked on the main tray 20. An output-sheet holder 79 for holding the recording sheets after image recording, output thereon, is positioned above the front side of the second tray 21.

[Structure of Printer Unit]

Figure 2:
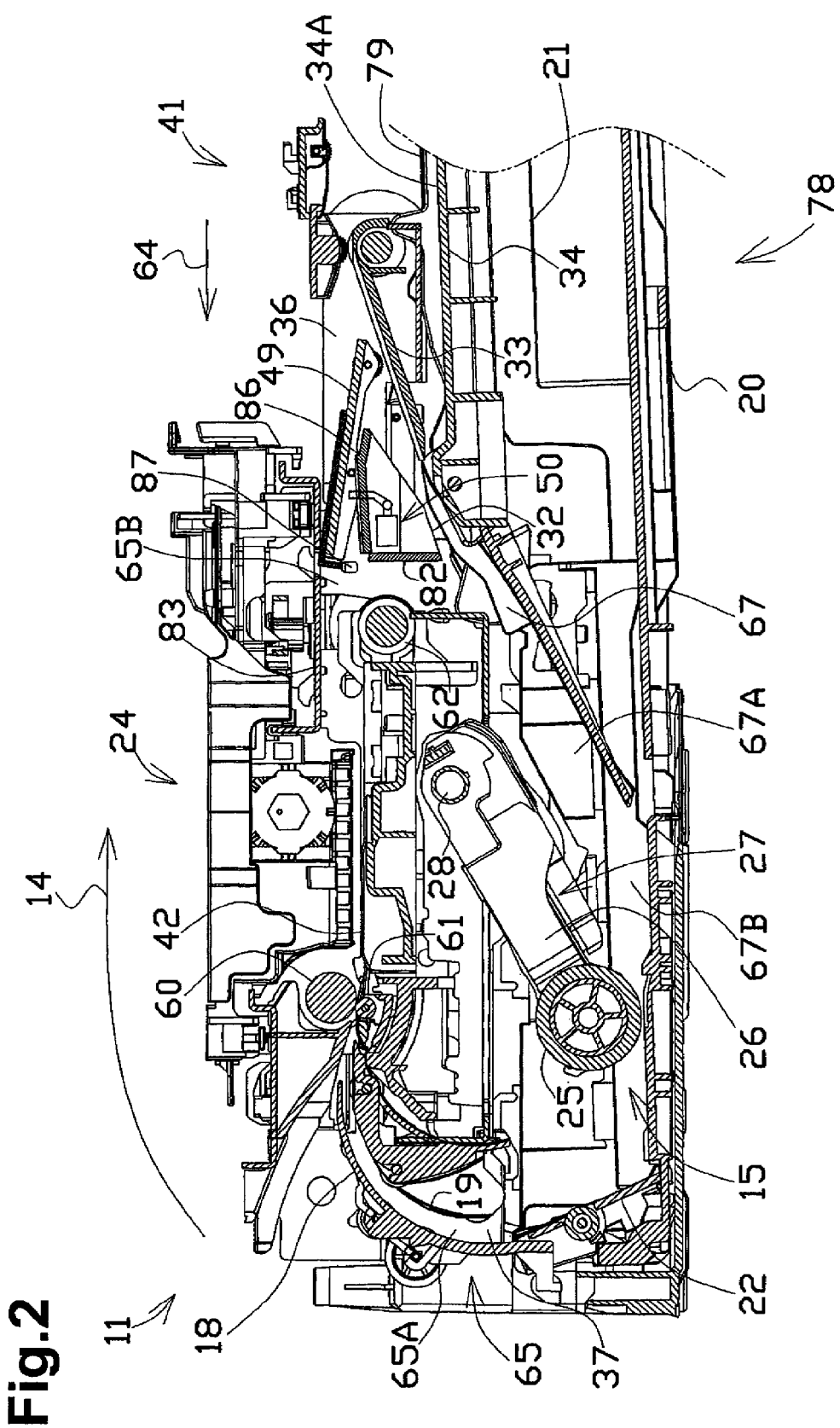
FIG. 2 is a cross-sectional view showing the interior of a printer unit of the multifunction device according to the embodiment of the present invention.

FIG. 2 is a cross-sectional view showing the interior of the printer unit 11. In FIG. 2, the front side of the sheet-feed cassette 78 is not shown.

The printer unit 11 includes, in addition to the above-described sheet-feed cassette 78, a feed unit 15 that picks a recording sheet from the sheet-feed cassette 78 to feed (send) the sheet, a recording unit 24 (an example of a "recording unit" according to the present invention) employing an ink jet recording method and discharging ink droplets onto the recording sheet fed by the feed unit 15 to form an image on the recording sheet, and a path-switching portion 41 that switches the conveying path of the recording sheet after image recording so that an image is recorded on the back surface (the second surface) of the top surface (the first surface). Note that the recording unit 24 may employ not only an ink jet method, but also various recording methods such as an electrophotography method and a thermal recording method.

[Conveying Path]

The printer unit 11 has, inside thereof, a conveying path 65 extending from an end (a rear end of the multifunction device 10) of the main tray 20 through the recording unit 24 to the output-sheet holder 79. The conveying path 65 includes a curved path 65A formed between the end of the main tray 20 and the recording unit 24 and a discharge path 65B formed between the recording unit 24 and the output-sheet holder 79.

As shown in FIG. 2, the curved path 65A extends from the vicinity of the upper end of an inclined separator plate 22 positioned at the main tray 20 to the recording unit 24. The curved path 65A has a substantially arch shape with the center at the inside of the printer unit 11. The curved path 65A is defined by an outer guide member 18 and an inner guide member 19 that are opposed to each other with a predetermined distance therebetween. Note that the outer guide member 18, the inner guide member 19, an upper guide member 83, a lower guide member 82, an upper inclined guide member 32, and a lower inclined guide member 33 (described below) all extend perpendicular to the plane of the sheet of FIG. 2 (the left-right direction 3 in FIG. 1).

The discharge path 65B is defined by the lower guide member 82 (an example of a "first guide member" according to the present invention) and the upper guide member 83 (an example of a "first guide member" according to the present invention) positioned on a front side of a first conveyance direction (hereinafter simply referred to as the "downstream side") of the recording unit 24. Herein, the first conveyance direction is a direction indicated by an arrow head 14 and means a direction in which the recording sheet is conveyed via the conveying path 65 and the recording unit 24 toward a reverse-conveying path 67.

Figure 3:
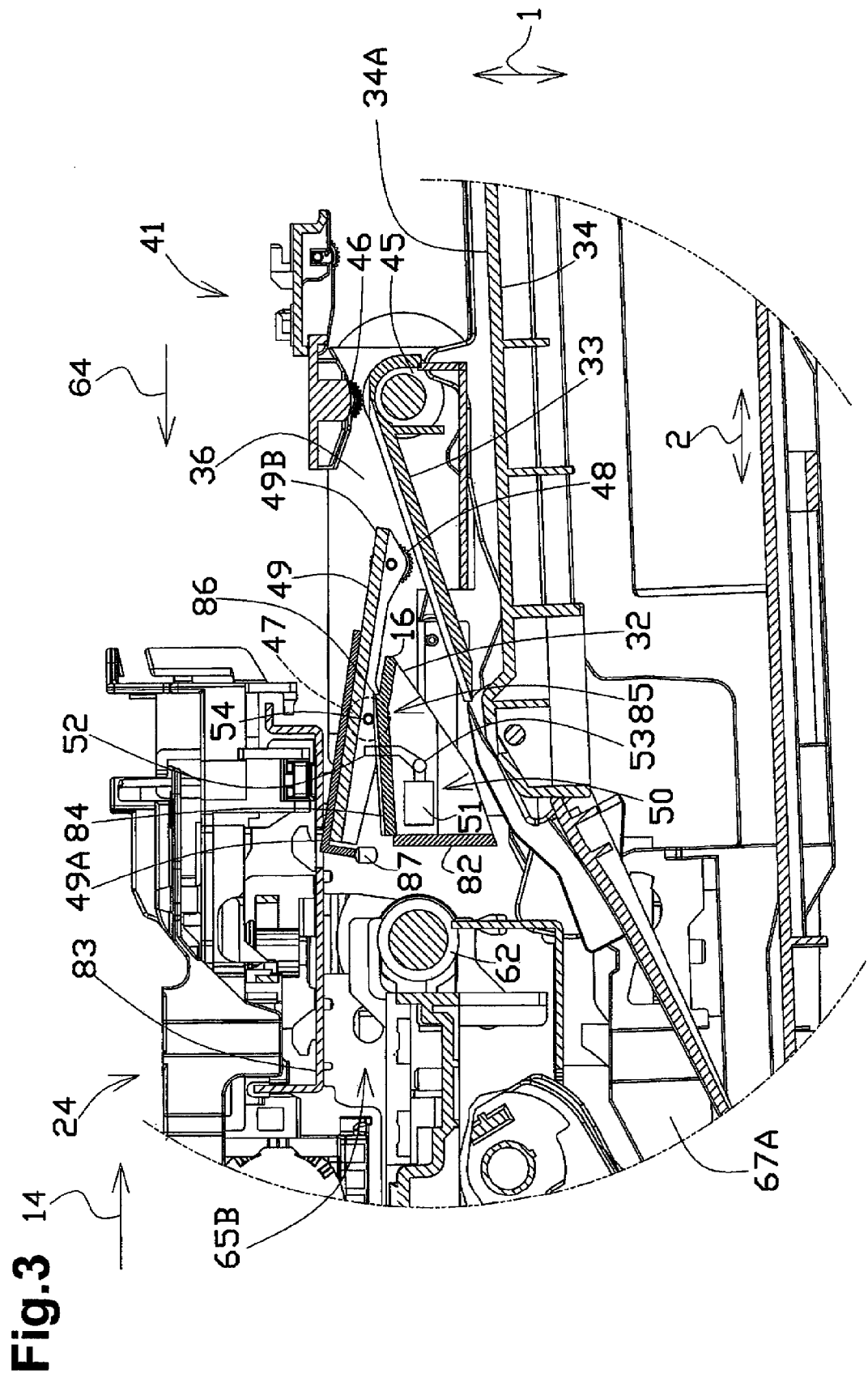
FIG. 3 is an enlarged cross-sectional view of a part around a discharge path of the multifunction device according to the embodiment of the present invention.
Figure 4:
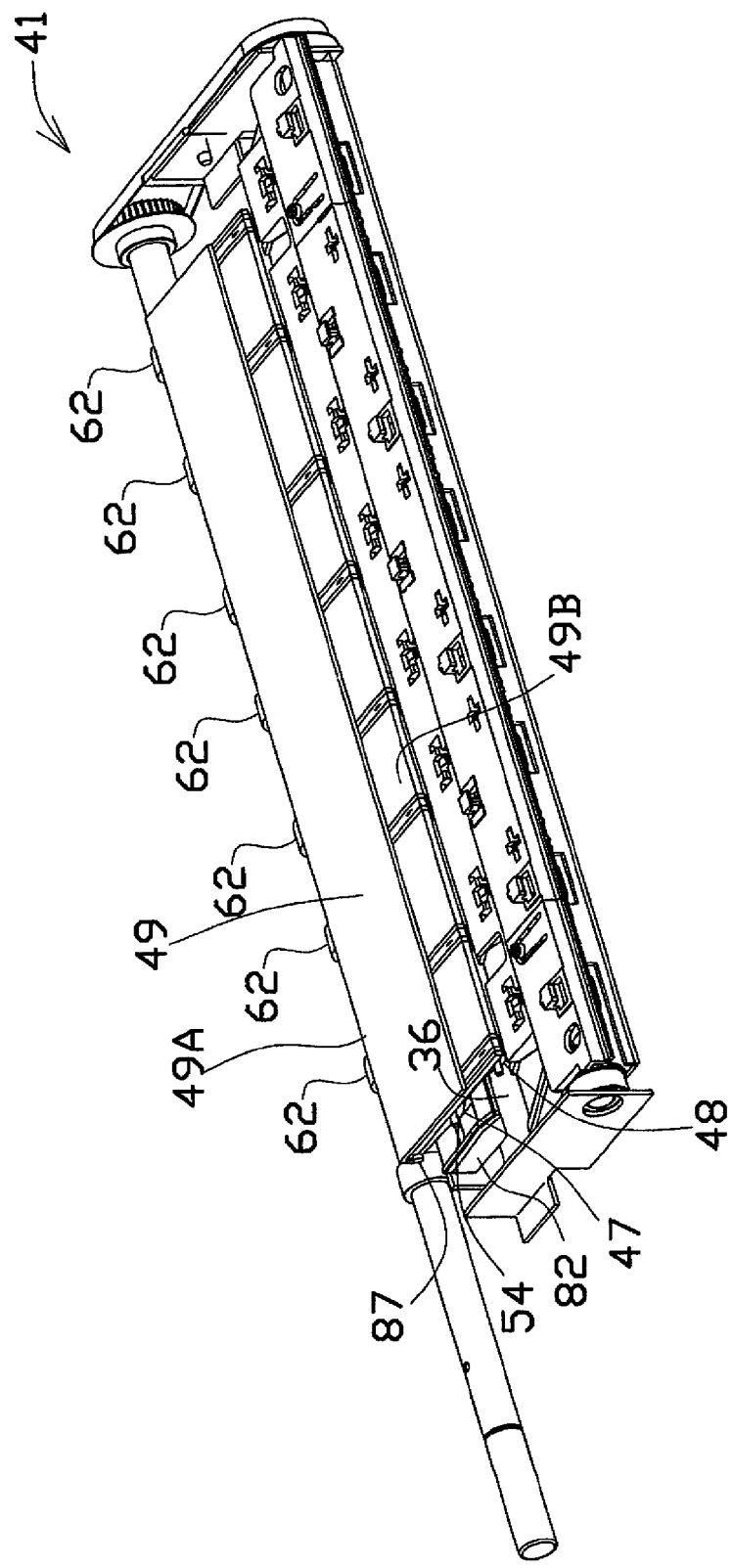
FIG. 4 is an enlarged perspective view of a part around the discharge path of the multifunction device according to the embodiment of the present invention.
Figure 5:
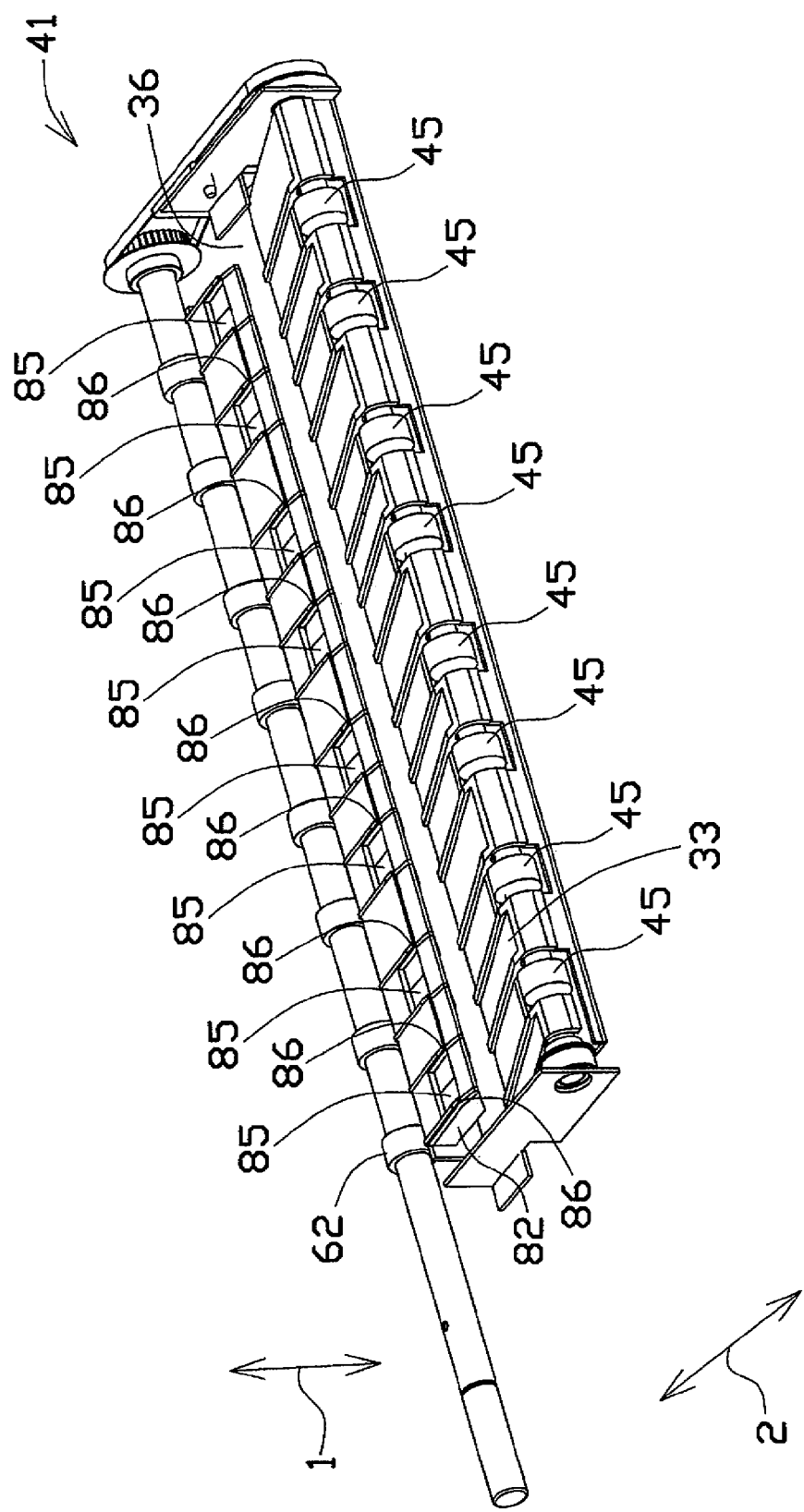
FIG. 5 is an enlarged perspective view of a lower guide member of the multifunction device according to the embodiment of the present invention.
Figure 6:
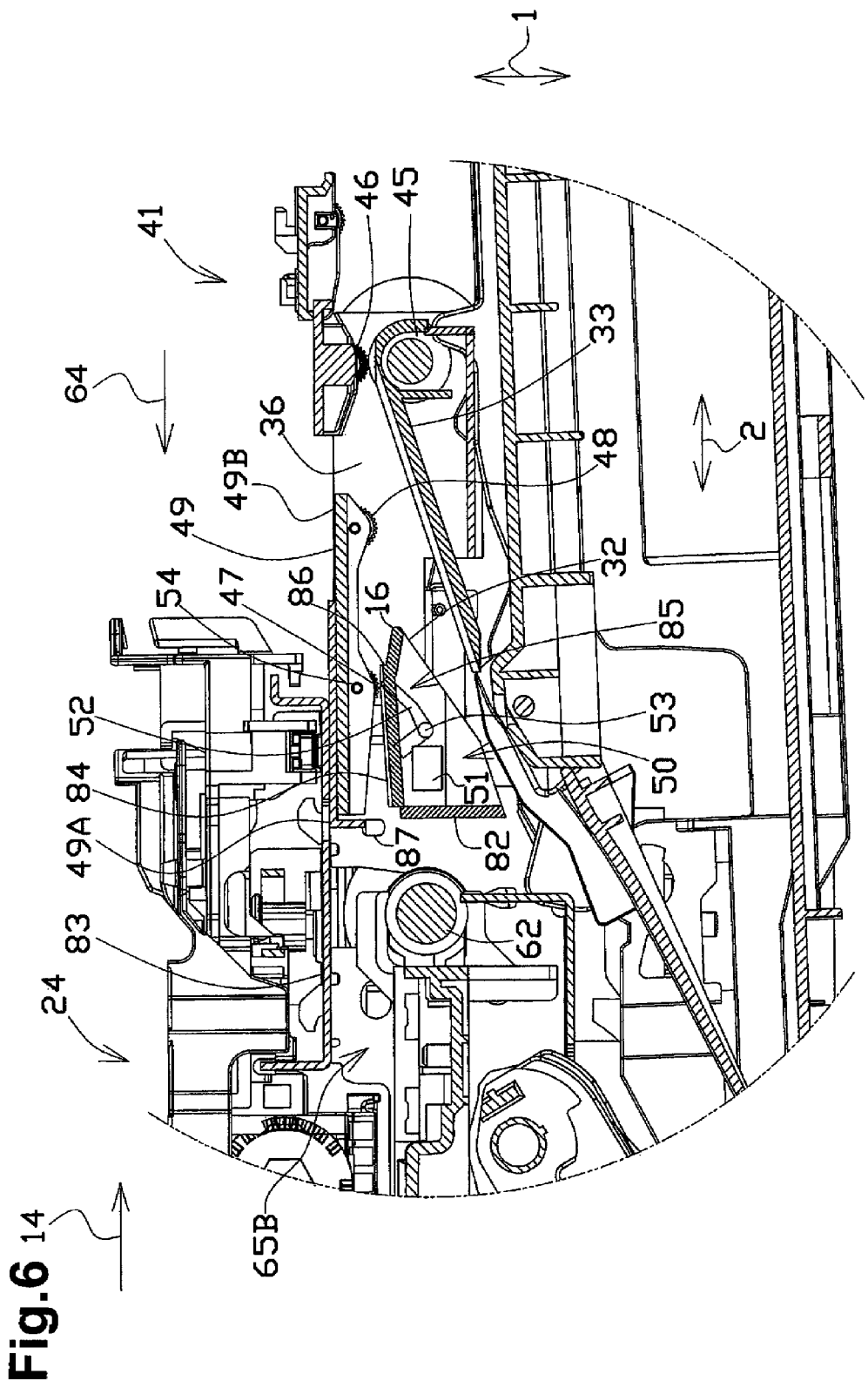
FIG. 6 is an enlarged cross-sectional view of a part around the discharge path of the multifunction device according to the embodiment of the present invention.

FIG. 3 and FIG. 6 are enlarged cross-sectional views of a part around the discharge path 65B. FIG. 4 is an enlarged perspective view of a part around the discharge path 65B. FIG. 5 is an enlarged perspective view of the lower guide member 82.

Referring to FIGS. 3 to 6, the lower guide member 82 extends substantially horizontally and projects in an antero-posterior direction 2. The lower guide member 82 is positioned on the downstream side with respect to the recording unit 24. Specifically, the lower guide member 82 is positioned on the downstream side with respect to a second conveyance roller (including a plurality of roller members) 62, which will be described below, and a spur roller 63 (see FIGS. 9A to 9G) facing the second conveyance roller 62, and extends substantially horizontally while projecting toward the downstream side. The lower guide member 82 has a guide-support surface 84 (an example of a "first guide member" according to the present invention). The guide-support surface 84 defines a portion of the discharge path 65B. Referring to FIG. 5, the lower guide member 82 also has recesses 85 (an example of a "recess" according to the present invention), which will be described below. The recesses 85 are grooves positioned in the guide-support surface 84. A piece of recording paper having an image recorded thereon is supported by the guide-support surface 84 from the underside (i.e., the back side in front-side recording, or the front side in back-side recording) thereof. The piece of recording paper is supported and guided by the guide-support surface 84 toward the downstream side.

Referring to FIGS. 3 and 5, a branch port 36 is positioned adjoining a downstream end 16 of the lower guide member 82. When two-sided image recording is performed, a piece of recording paper conveyed along the discharge path 65B is switched back on the downstream side with respect to the branch port 36. The piece of recording paper that has been switched back so as to be conveyed in a second conveyance direction 64 is conveyed obliquely downward from the branch port 36.

Referring to FIG. 5, the recesses 85 are positioned in the lower guide member 82. The recesses 85 are grooves extending in the anteroposterior direction 2. The recesses 85, positioned in the guide-support surface 84 of the lower guide member 82 as described above, may be lengthened toward the downstream side so as to reach the downstream end 16 of the lower guide member 82. In that case, the recesses 85 communicate with the branch port 36. The sizes and positions of the recesses 85 are designed such that roller members included in a first auxiliary roller 47 (an example of a "protruding portion" according to the present invention), which will be described below, can be moved into and out of the recesses 85, respectively. In the present embodiment, as can be seen from FIG. 5, a plurality (eight in the embodiment) of the recesses 85, i.e., grooves, are positioned next to one another in a comb-like arrangement.

Referring to FIGS. 3 and 5, the lower guide member 82 has stepped portions 86 (an example of a "stopper", "stepped portion" according to the present invention). Each of the stepped portions 86 adjoins a corresponding one of the recesses 85 and is positioned on the downstream side of the recess 85. The stepped portions 86 are formed by carving the guide-support surface 84 downward. That is, the stepped portions 86 each have a wall extending in a vertical direction 1.

Referring to FIG. 3, the upper guide member 83 is positioned above the lower guide member 82. The upper guide member 83 and the lower guide member 82 are opposed to each other with a predetermined distance, allowing a recording sheet to pass, therebetween.

[Reverse-Conveying Path]

Referring to FIG. 2, the printer unit 11 has, inside thereof, the reverse-conveying path 67. The reverse-conveying path 67 branched from the discharge path 65B extends between the sheet-feed cassette 78 and the recording unit 24, and joins to a merging point 37 on the upstream side of the recording unit 24 at a rear side of a first conveyance direction (hereinafter simply referred to as the "upstream side").

The reverse-conveying path 67 includes an inclined path 67A and a straight path 67B. Referring to FIGS. 2 and 3, the inclined path 67A is defined by the upper inclined guide member 32 and the lower inclined guide member 33 (an example of a "second guide member" according to the present invention) having inclined surfaces that extend obliquely downward to the rear from the branch port 36. The upper inclined guide member 32 is integral with the lower guide member 82. These guide members 32 and 33 are opposed to each other with a predetermined distance, allowing a recording sheet to pass, therebetween. The upper inclined guide member 32 is disposed above the lower inclined guide member 33. These guide members 32 and 33 extend downward from the branch port 36, and, more specifically, they extend obliquely downward to the rear.

Referring to FIG. 2, the straight path 67B extends linearly from the vicinity of the terminal end of the inclined path 67A. The straight path 67B is defined by a top surface 34A of a slide guide 34 that is supported so as to be slidable in the front-rear direction 2. The slide guide 34 is positioned between the second tray 21 and the output-sheet holder 79 and is slidable along the front-rear direction 2.

Because of the thus-formed conveying path 65 and the reverse-conveying path 67, a recording sheet fed by the feed unit 15 from the main tray 20 or the second tray 21 is conveyed to the recording unit 24 through the curved path 65A. Because the recording sheet is conveyed along the curved path 65A, the recording sheet is turned over after being fed from the feed unit 15. That is to say, a side (front side), of the recording sheet opposite the side having been in contact with a sheet-feed roller 25 of the feed unit 15 faces the recording unit 24. When an image is recorded only on the front side of the recording sheet, the recording sheet having passed the recording unit 24 passes through the discharge path 65B and is conveyed to the output-sheet holder 79. Alternatively, when an image is recorded both on the front side and the rear side of the recording sheet, the path-switching portion 41 switches the conveying path and the recording sheet is conveyed to the reverse-conveying path 67. The recording sheet conveyed to the reverse-conveying path 67 passes through the inclined path 67A, the straight path 67B and the curved path 65A, and is again turned over and conveyed such that the rear side faces the recording unit 24. The path-switching portion 41 will be described below.

[Recording Unit]

Referring to FIG. 2, the recording unit 24 is disposed above the sheet-feed cassette 78. The recording unit 24 is configured to reciprocate in a main scanning direction (the direction perpendicular to the plane of the sheet of FIG. 2). A platen 42 is positioned below the recording unit 24. The platen 42 supports the recording sheet horizontally during image recording by the recording unit 24. While reciprocating in the main scanning direction, the recording unit 24 discharges fine droplets of ink, supplied from an ink cartridge (not shown), through nozzles 39 onto the recording sheet conveyed on the platen 42. Thus, an image is recorded on the recording sheet.

A first conveyance roller 60 and a pinch roller 61, forming a pair, are positioned in the curved path 65A. The pinch roller 61 is disposed below the first conveyance roller 60 and is urged against the roller surface of the first conveyance roller 60 by an elastic member such as a spring (not shown). The first conveyance roller 60 and the pinch roller 61 nip the recording sheet conveyed along the curved path 65A and send the sheet onto the platen 42.

A registration sensor 66 (see FIG. 7) is positioned at a specific position in the curved path 65A. The registration sensor 66 is positioned on the upstream side with respect to the first conveyance roller 60. The registration sensor 66 has a known configuration including a rotor and an optical sensor (for example, a photointerrupter). The rotor projects in the curved path 65A in such a manner as to cross the curved path 65A. When a piece of recording paper conveyed through the curved path 65A comes into contact with the rotor, the rotor is tilted down, whereby the optical sensor is turned on or off. In accordance with a signal or the like output from the optical sensor, the position of the leading end or the trailing end of the piece of recording paper in the conveying path 65 is found.

Referring to FIGS. 2 and 3, the second conveyance roller 62 and the spur roller 63, forming a pair, are positioned on the downstream side with respect to the recording unit 24. The spur roller 63 is disposed above the second conveyance roller 62 and is urged against the roller surface of the second conveyance roller 62 by its own weight or a spring. The second conveyance roller 62 and the spur roller 63 nip the recording sheet after recording and convey the sheet toward a further downstream side.

The first conveyance roller 60 and the second conveyance roller 62 are driven by a conveyance motor 71 (see FIG. 7) functioning as a drive source. The conveyance rollers 60 and 62 are driven intermittently and in synchronization with each other. Thus, each piece of recording paper is conveyed in units of line-feed lengths. The first conveyance roller 60 is positioned with a rotary encoder 97 (not shown by shown in FIG. 7). The rotary encoder 97 detects with an optical sensor a pattern on an encoder disc (not shown) that rotates together with the first conveyance roller 60. In accordance with a signal detected in this manner, the rotation of the first and second conveyance rollers 60 and 62 are controlled.

[Feed Unit]

The feed unit 15 conveys the recording sheets accommodated in the sheet-feed cassette 78 toward the curved path 65A. The feed unit 15 includes the sheet-feed roller 25, a sheet-feed arm 26, and a drive-transmission mechanism 27. The sheet-feed roller 25 is disposed above the sheet-feed cassette 78. The sheet-feed roller 25 supported so as to be rotatable at an end of the sheet-feed arm 26 feeds the recording sheets accommodated in the main tray 20 or second tray 21 of the sheet-feed cassette 78 to the curved path 65A. The sheet-feed roller 25 is rotationally driven by a sheet-feed motor 73 (see FIG. 7) via the drive-transmission mechanism 27. The drive-transmission mechanism 27 is positioned on the sheet-feed arm 26 and includes a plurality of gears that are arranged linearly.

The sheet-feed arm 26 is supported by the base shaft 28 at the base end thereof and is rotatable about the base shaft 28. Thus, the sheet-feed arm 26 can move vertically toward and away from the main tray 20. Furthermore, the sheet-feed arm 26 is urged toward the sheet-feed cassette 78 by its own weight or an elastic force exerted by an elastic member such as a spring. Therefore, the sheet-feed roller 25 can be urged against the top surface of the recording sheets accommodated in the sheet-feed cassette 78. When the sheet-feed cassette 78 is inserted into the printer unit 11, the rear end (for example, the inclined separator plate 22) of the sheet-feed cassette 78 pushes the sheet-feed arm 26 upward.

[Path-Switching Portion]

Referring to FIGS. 3 and 5, the path-switching portion 41 is disposed near the branch port 36. As shown in FIG. 3, the path-switching portion 41 includes a third conveyance roller 45 (an example of a "conveying roller" according to the present invention), a spur roller 46, and a flap 49 (an example of a "first guide member", "a moving member", "a rotating member" according to the present invention) having the first auxiliary roller 47 and a second auxiliary roller 48 (an example of a "pressing portion" according to the present invention).

The third conveyance roller 45 is positioned on the downstream side of the lower guide member 82. The third conveyance roller 45 is positioned near a downstream side of the branch port 36. The third conveyance roller 45 is supported by, for example, the frame of the printer unit 11 so as to be rotatable. The spur roller 46 is disposed above the third conveyance roller 45 and is urged against the roller surface of the third conveyance roller 45 by its own weight or a spring. The third conveyance roller 45 is rotationally driven in the forward- or reverse-rotation direction by the conveying motor 71 (see FIG. 7). For example, when recording is performed on the front side of the recording sheet, the third conveyance roller 45 is rotated in the forward-rotation direction. As a result, the recording sheet nipped by the third conveyance roller 45 and the spur roller 46 is conveyed to the downstream side and is output onto the output-sheet holder 79. On the other hand, when recording is performed on both sides of the recording sheet, while the third conveyance roller 45 and the spur roller 46 nip the rear end of the recording sheet, the rotation direction of the third conveyance roller 45 is switched from the forward-rotation direction to the reverse-rotation direction.

When the third conveyance roller 45 and the spur roller 46 nip the recording sheet, the recording sheet is conveyed toward the direction corresponding to the rotation direction of the third conveyance roller 45 (toward the upstream side or the downstream side). That is, the third conveyance roller 45 and the spur roller 46 can convey the recording sheet to a further downstream side along the discharge path 65B (toward the output-sheet holder 79) and can convey the recording sheet to the inclined path 67A of the reverse-conveying path 67. The operations of the path-switching portion 41 and the recording sheet during recording on one side and both sides will be described below.

Referring to FIGS. 3 and 4, the flap 49 is supported by the support shaft 87. The support shaft 87 is positioned at the lower guide member 82. The support shaft 87 extends in a direction perpendicular to the plane of the sheet of FIG. 3 and is positioned on the upstream side of the branch port 36 (on the front side in the first conveyance direction). The flap 49 extends toward the downstream side from the support shaft 87. A base end 49A, on the upstream side, of the flap 49 is rotatably supported by the support shaft 87. An extended end 49B of the flap 49 reaches a position above the branch port 36, more specifically, a position beyond a central portion of the branch port 36 and close to the third conveying roller 45.

The first auxiliary roller 47 is positioned at a central portion of the flap 49. More specifically, the first auxiliary roller 47 is positioned closer to the support shaft 87 than the second auxiliary roller 48. The second auxiliary roller 48 is positioned at the extended end 49B of the flap 49. The second auxiliary roller 48 is disposed at a distance at the downstream side with respect to the first auxiliary roller 47. The roller surfaces of the first auxiliary roller 47 and the second auxiliary roller 48 have, similarly to the spur rollers 63 and 46, a spur shape because they are brought into contact with the recording surfaces of the recording sheets.

The flap 49 rotates between a first orientation (shown in FIG. 3) and a second orientation (shown in FIG. 6). When the flap is positioned at the first position, the extended end 49B of the first auxiliary roller 47 is positioned below the branch port 36, as shown in FIGS. 3 and 5. When the flap is positioned at the second position, the first auxiliary roller 47 is retracted from the recesses 85, as shown in FIG. 6. In this embodiment, the flap 49 is rotationally urged so as to be always at the first position by its own weight. Alternatively, the flap 49 may be urged so as to be at the first position by an elastic member such as a spring.

[Sheet Sensor]

Referring to FIG. 3, a sheet sensor 50 is positioned on the downstream side with respect to the second conveyance roller 62. The sheet sensor 50 detects the presence of a piece of recording paper on the guide-support surface 84 of the lower guide member 82. The sheet sensor 50 includes a rotor 52 and an optical sensor 51 (for example, a photointerrupter). The rotor 52 projects in the discharge path 65B and extends in such a manner as to cross the discharge path 65B. When a piece of recording paper conveyed through the discharge path 65B comes into contact with the rotor 52, the rotor 52 is tilted down, whereby the optical sensor 51 is turned on or off. In accordance with a signal or the like output from the optical sensor 51, the presence of a piece of recording paper on the guide-support surface 84 is checked, and the position of the leading end or the trailing end of the piece of recording paper is found.

Referring to FIG. 3, the rotor 52 is supported by a shaft 53 and is rotatable about the shaft 53. The shaft 53 is positioned on a frame or the like of the printer unit 11. The shaft 53 is positioned below the lower guide member 82 and above an upper sloping-guide member 32. In the present embodiment, in a normal state (a state where the rotor 52 is under no external force), the rotor 52 is in an optical path extending from a light emitter to a light receptor of the optical sensor 51, thereby blocking light traveling along the optical path. When a piece of recording paper is conveyed along the guide-support surface 84 toward the downstream side, an external force is applied to the rotor 52 by the piece of recording paper, whereby the optical path extending from the light emitter to the light receptor of the optical sensor 51 is opened. When the light receptor receives the light, an output signal from the light receptor changes. More specifically, the signal level of the output signal changes from LOW to HIGH. On the basis of the change in signal level, a control unit 90 (an example of a "control unit" according to the present invention) (see FIG. 7) detects the presence/absence of the recording sheet passing through the discharge path 65B or the inclined path 67A and the position of the leading end or trailing end of the recording sheet in the traveling direction.

In this embodiment, because an elastic member such as a torsion coil spring is attached to the support shaft 53, even if the rotor 52 is rotated to a position shown in FIG. 6, once the recording sheet passes through, the rotor 52 returns to the original state, shown in FIG. 3. As a result, the rotor 52 enters the optical path of the optical sensor 51, blocking the light passing through the optical path. At this time, the signal level of the output signal of the light-receiving element of the optical sensor 51 changes from HIGH to LOW. On the basis of the change in signal level, the control unit 90 detects the presence/absence and position of the trailing end of the recording sheet passing through the discharge path 65B or the inclined path 67A in the traveling direction.

[Control Portion]

Figure 7:
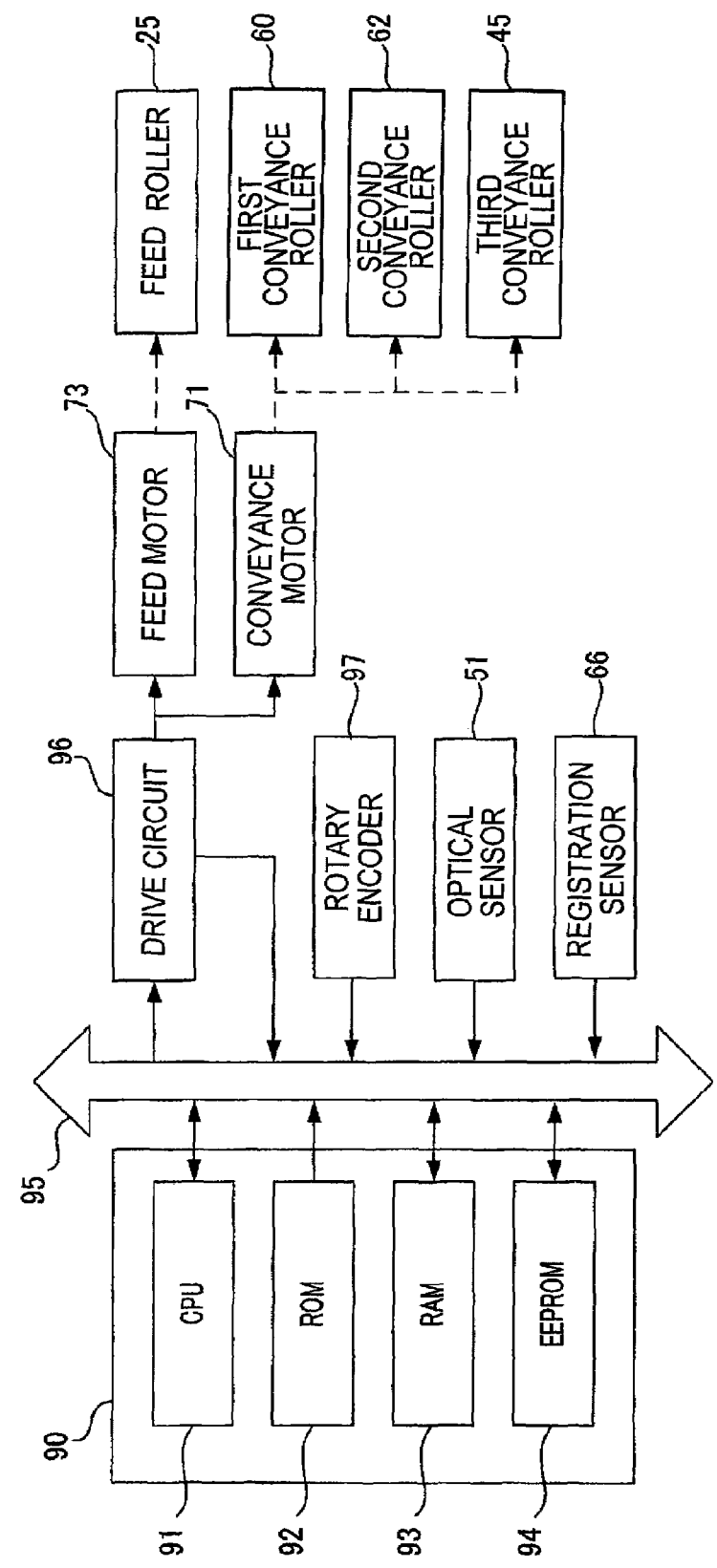
FIG. 7 is a block diagram of a control unit and related elements of the multifunction device according to the embodiment of the present invention.

FIG. 7 is a block diagram showing the structure of the control unit 90 of the multifunction device 10. Although the control unit 90 controls the overall operation of the multifunction device 10, a detailed description of the control of the scanner unit 12 and the recording unit 24 will be omitted. In this embodiment, the control unit 90 provides a "control device" of the present invention.

The control unit 90 is configured as a micro computer consisting mainly of a central processing unit (CPU) 91 for performing calculation, a read-only memory (ROM) 92 that stores a control program etc., a random access memory (RAM) 93 that is used as a data storage area or an operation area, and an electrically erasable programmable read-only memory (EEPROM) 94 that stores setting information. These components are connected to one another via a bus 95 so as to be able to transfer the data.

A driving circuit 96 is connected to the bus 95. The driving circuit 96 drives the conveying motor 71 connected to the first conveying roller 60, the second conveying roller 62, the third conveying roller 45, etc., and the sheet-feed motor 73 connected to the sheet-feed roller 25. The driving circuit 96 includes drivers for driving the conveying motor 71 and the sheet-feed motor 73. The conveying motor 71 and the sheet-feed motor 73 are independently controlled by these drivers. The rotational force of the conveying motor 71 is transmitted to the first conveying roller 60, the second conveying roller 62, and the third conveying roller 45 via a known drive-transmission mechanism, and the rotational force of the sheet-feed motor 73 is transmitted to the sheet-feed roller 25.

In the multifunction device 10 according to this embodiment, the conveying motor 71 serves as a driving source for the first and second conveying rollers 60 and 62 that convey the recording sheet toward the platen 42, or convey the recording sheet positioned on the platen 42 or the recording sheet after recording toward the output-sheet holder 79. Furthermore, the conveying motor 71 serves as a driving source for rotating the third conveying roller in the forward- or reverse-rotation direction.

Moreover, the optical sensor 51 and a rotary encoder 97 for detecting the number of rotations of the third conveying roller 45 driven by the conveying motor 71 are connected to the bus 95. The control unit 90 obtains the information about the presence/absence of the recording sheet in the discharge path 65B, the passing position of the leading end or trailing end of the recording sheet in the discharge path 65B, and the conveyance amount of the recording sheet, on the basis of the level of the output signal of the optical sensor 51 and the encoding amount detected by the rotary encoder 97.

[Image-Recording Operation]

Referring to FIG. 2, a piece of recording paper is conveyed along the conveying path 65 in a first conveyance direction 14. The recording unit 24 records an image onto the front side of the piece of recording paper. The piece of recording paper having the image recorded on the front side thereof is further conveyed toward the downstream side by the second conveyance roller 62 and so forth while being supported by the lower guide member 82 from the back side thereof.

In the normal state, the flap 49 is in a position, a first position, shown in FIG. 3, and the roller members of the first auxiliary roller 47 are in the respective recesses 85 (see FIG. 5). Therefore, when the piece of recording paper is conveyed toward the downstream side, the leading end (the leading end in front-side recording and corresponding to a "first end" according to the present invention) of the piece of recording paper comes into contact with the first auxiliary roller 47. When the piece of recording paper is further conveyed toward the downstream side, the piece of recording paper gradually covers the recesses 85 while pushing the first auxiliary roller 47 relatively upward. Since the flap 49 is turnable about a shaft 87, when the first auxiliary roller 47 is pushed upward by the piece of recording paper, the flap 49 turns from the first position shown in FIG. 3 to a second position shown in FIG. 6.

The position of the trailing end (the leading end in back-side recording and corresponding to a "second end" according to the present invention) of the piece of recording paper that is being conveyed toward the downstream side is detected by the sheet sensor 50. That is, the trailing end of the piece of recording paper is detected to have passed the sheet sensor 50, and the rotary encoder 97 detects the amount of rotation of the third conveyance roller (including a plurality of roller members) 45 and the length of conveyance of the piece of recording paper. Thus, the position of the trailing end of the piece of recording paper in front-side recording, i.e., the leading end of the piece of recording paper in back-side recording, is detected. When the trailing end of the piece of recording paper has passed the first auxiliary roller 47, the flap 49 returns from the second position to the first position.

When the flap 49 returns to the first position, the second auxiliary roller 48 presses the piece of recording paper downward. If image recording is performed only on the front side, the third conveyance roller 45 is immediately rotated, whereby the piece of recording paper is discharged. If image recording is to be performed on the back side of the piece of recording paper after the image recording onto the front side of the recording paper, the flap 49 returns to the first position, and the second auxiliary roller 48 presses the piece of recording paper downward. Subsequently, when the trailing end of the piece of recording paper reaches a position between the first auxiliary roller 47 and the second auxiliary roller 48, the control unit 90 causes the third conveyance roller 45 to be rotated in the reverse direction. Thus, the piece of recording paper is conveyed in the reverse direction, i.e., in the second conveyance direction 64 (see FIG. 3). Since the roller members of the first auxiliary roller 47 are in the respective recesses 85, even if the piece of recording paper is conveyed in the reverse direction, the movement of the trailing end of the piece of recording paper that is conveyed in the reverse direction is stopped. Accordingly, the piece of recording paper is forcibly bent while being pressed by the second auxiliary roller 48 so as to project on the back side thereof. Subsequently, the piece of recording paper is conveyed into the reverse-conveying path 67 and is returned into the conveying path 65 with the second end (the leading end in backside recording) thereof being the leading end, and an image is then recorded onto the back side of the piece of recording paper by the recording unit 24.

Figure 8A:
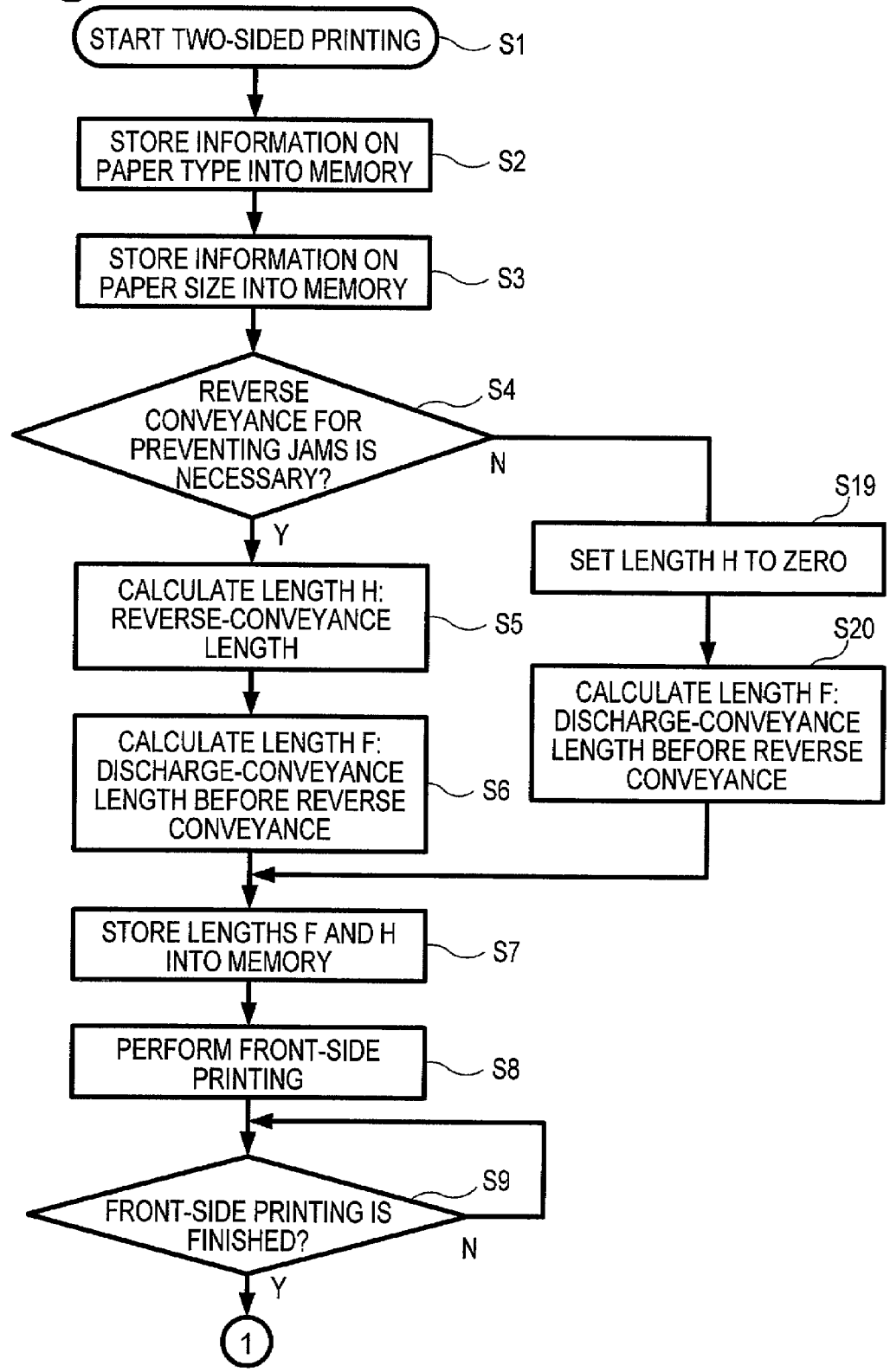

FIGS. 8A and 8B are a flowchart of a two-sided image recording operation. FIGS. 9A to 9G are schematic diagrams showing the recording-paper-conveying system of the printer unit 11.

Referring to FIGS. 8A and 8B, when a multifunction device 10 starts two-sided printing (step S1), pieces of information on the type (step S2) and size (step S3) of a piece of recording paper used for the current print job are stored into a random access memory (RAM) 93. A central processing unit (CPU) 91 checks, in accordance with the foregoing pieces of information, whether or not a process of conveying the piece of recording paper in the reverse direction and intentionally bending the piece of recording paper (steps S5 to S14: a reverse-conveyance process for preventing jams) as described above is necessary (step S4). This check is performed in accordance with a program stored in a read-only memory (ROM) 92. The criteria of this check, which are the pieces of information on the type and size of the piece of recording paper, may also include the amount of ink ejected onto the piece of recording paper. This is because deformation such as cackling occurs more frequently on thinner pieces of recording paper and when more ink is ejected.

Referring to FIGS. 8A and 8B, if it is determined, in accordance with the type (i.e., thickness and size) of the piece of recording paper and the amount of ejected ink, that the "process of intentionally bending the piece of recording paper" is to be performed (if YES in step S4), a reverse-conveyance length H for intentionally bending the piece of recording paper is calculated (step S5). This calculation is performed by the CPU 91 in accordance with a program stored in the ROM 92. The CPU 91 determines the reverse-conveyance length H from the type of the piece of recording paper and the amount of ink ejected onto the piece of recording paper. Subsequently, in accordance with the reverse-conveyance length H, a discharge-conveyance length F representing a length of conveyance before the reverse conveyance of the piece of recording paper is started is calculated (step S6). The discharge-conveyance length F is set to be smaller than the reverse-conveyance length H. The discharge-conveyance length F and the reverse-conveyance length H are stored into the RAM 93 (step S7). Data on the reverse-conveyance length H and the discharge-conveyance length F are reflected in the conveyance of the piece of recording paper in the following manner.

Figure 9A:
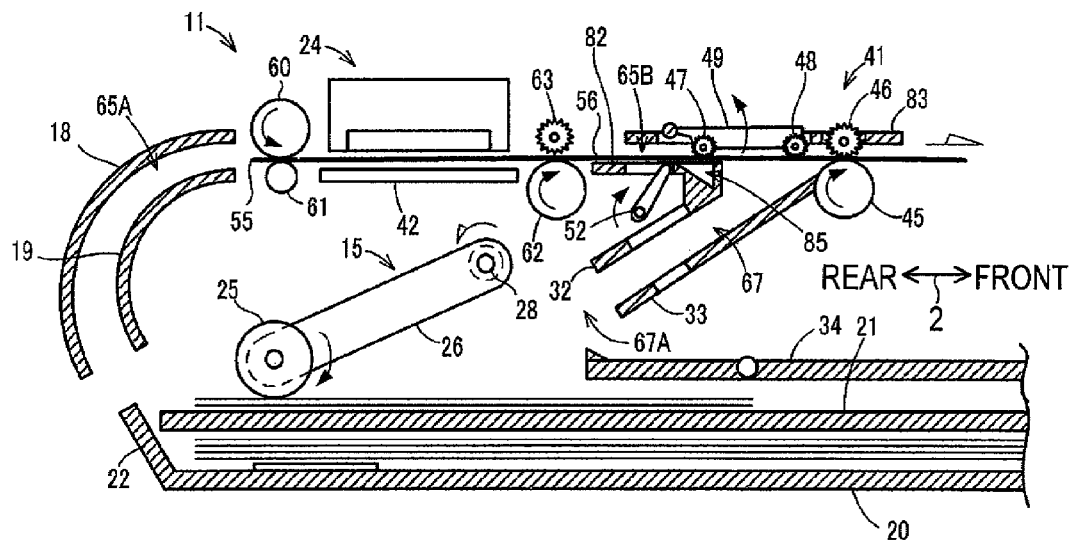
FIGS. 9A to 9G are schematic diagrams showing a recording-paper-conveying system of the printer unit of the multifunction device according to the embodiment of the present invention.
Figure 9B:
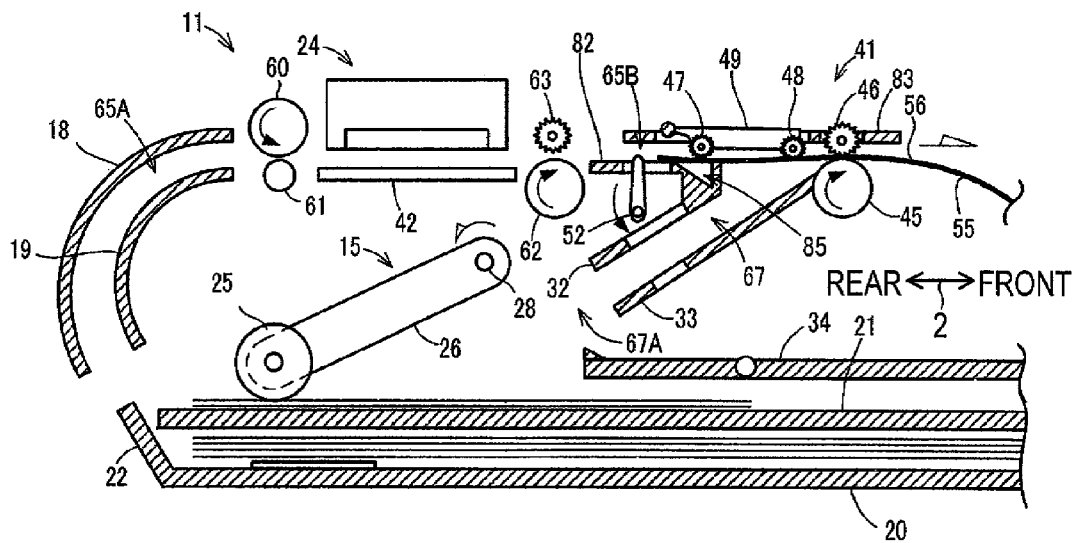

Referring to FIGS. 8 to 9B, when a feed motor 73 is driven, a piece of recording paper 55 is fed by a feed roller 25. The fed piece of recording paper 55 is conveyed along the curved path 65A, making a U-turn from the lower side to the upper side, toward the recording unit 24. In this process, the piece of recording paper 55 is turned over such that a side (front side 56) thereof opposite the side with which the feed roller 25 was in contact faces the recording unit 24. When the piece of recording paper 55 reaches the first conveyance roller 60 and a pinch roller 61, the rotation of the feed roller 25 is stopped, and the piece of recording paper 55 is conveyed into a space between the recording unit 24 and a platen 42 by the first conveyance roller 60 and the pinch roller 61. In this state, the recording unit 24 starts image recording (step S8). The piece of recording paper 55 having an image recorded by the recording unit 24 on the front side 56 thereof is conveyed into the discharge path 65B by the second conveyance roller 62 and the spur roller 63. During the image recording onto the front side 56, whether or not the image recording onto the front side 56 is finished is checked (step S9). If the image recording onto the front side 56 is not finished (if NO in step S9), the image recording onto the front side 56 is continued. If the image recording onto the front side 56 is finished (if YES in step S9), the piece of recording paper 55 is further conveyed toward the downstream side by the second conveyance roller 62 and the spur roller 63 along the discharge path 65B (step S10).

During the conveyance of the piece of recording paper 55 along the discharge path 65B, when the leading end (the leading end in front-side recording) of the piece of recording paper 55 reaches the rotor 52, the rotor 52 turns clockwise as in FIG. 9A. This changes the output signal of the optical sensor 51 (see FIG. 7) from the LO level to the HIGH level. The control unit 90 detects this change of the signal level, thereby detecting the position of the leading end of the piece of recording paper 55 in the discharge path 65B. That is, the control unit 90 detects that the leading end of the piece of recording paper 55 has reached the rotor 52.

The piece of recording paper 55 is further conveyed and the leading end thereof approaches the first auxiliary roller 47 on the flap 49. The piece of recording paper 55 gradually covers the recesses 85 positioned in the lower guide member 82 and knocks against the first auxiliary roller 47. At this time, the first auxiliary roller 47 receives from the piece of recording paper 55 a force to turn the flap 49 upward, whereby, as in FIG. 9A, the flap 49 turns from the first position shown in FIG. 3 to the second position shown in FIG. 6. The piece of recording paper 55 is further conveyed toward a side of a discharged-paper receiver 79.

When the piece of recording paper 55 is conveyed toward the downstream side and the trailing end (the trailing end in front-side recording) thereof passes the rotor 52, the force applied to the rotor 52 from the piece of recording paper 55 is released. Accordingly, the rotor 52 turns counterclockwise and returns to the initial position as in FIG. 9B. This changes the output signal of the optical sensor 51 from the HIGH level to the LO level. The control unit 90 detects this change of the signal level, thereby detecting the position of the trailing end of the piece of recording paper 55 in the discharge path 65B (step S11). That is, the control unit 90 detects that the trailing end of the piece of recording paper 55 has passed the rotor 52.

The flap 49 is continuously urged so as to be in the first position. Therefore, when the trailing end of the piece of recording paper 55 that is being conveyed passes the first auxiliary roller 47, the flap 49 tends to return to the first position as in FIG. 9C. When it is detected that the trailing end of the piece of recording paper 55 has passed the rotor 52 (if YES in step S11), the control unit 90 first causes the piece of recording paper 55 to be conveyed by a predetermined length (the discharge-conveyance length F) (step S12) and subsequently causes the third conveyance roller 45 to be rotated in the reverse direction. The discharge-conveyance length F corresponds to a length of the movement of the trailing end of the piece of recording paper 55 from the rotor 52 past the first auxiliary roller 47 to the downstream end 16 of the lower guide member 82. The discharge-conveyance length F is determined in accordance with the encoded amount indicated by the rotary encoder 97. Therefore, the control unit 90 stops the conveyance of the piece of recording paper 55 at a point after the trailing end of the piece of recording paper 55 passes the first auxiliary roller 47 and before the trailing end of the piece of recording paper 55 reaches the downstream end 16, and then immediately starts reverse conveyance of the piece of recording paper 55.

Figure 9C:
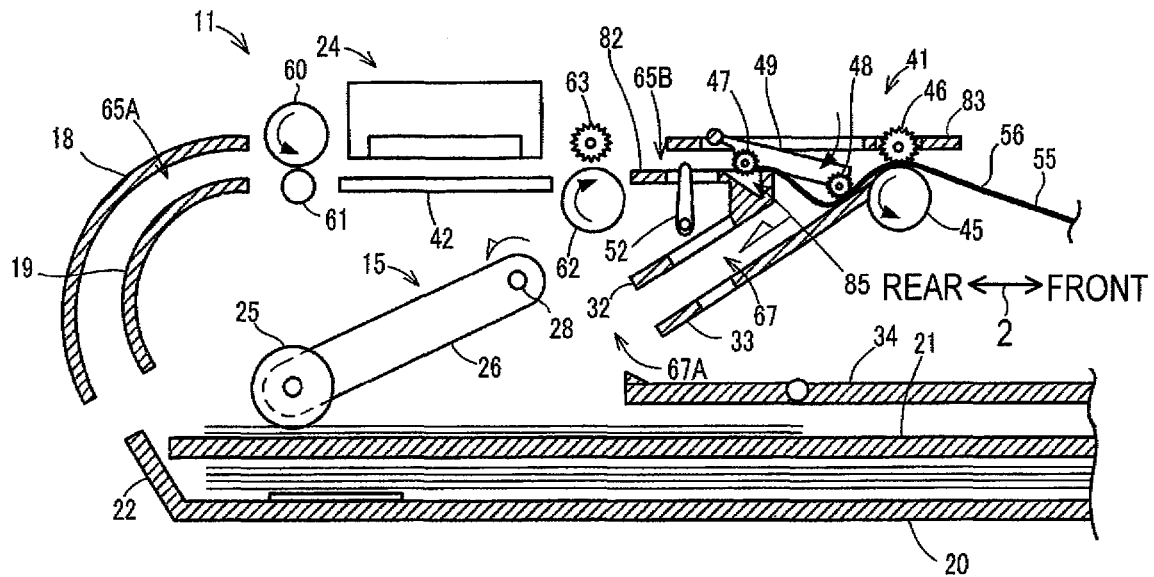
Figure 9D:
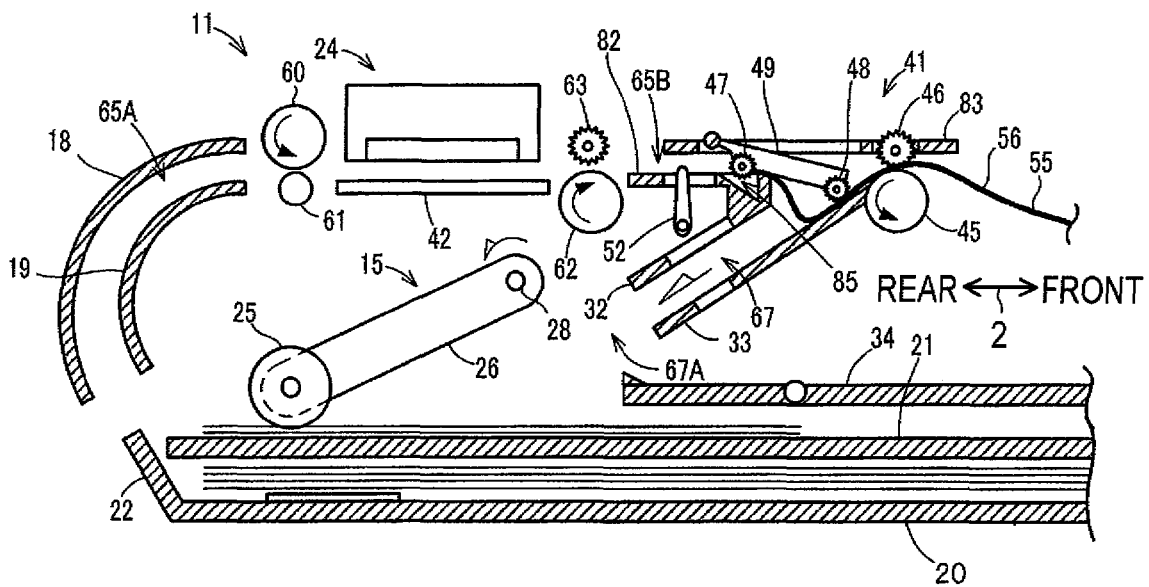

Since the flap 49 turns to the first position, referring to FIG. 9C, the piece of recording paper 55 is bent by the second auxiliary roller 48 so as to project downward. In this state, the trailing end of the piece of recording paper 55 is nipped between the flap 49 and the lower guide member 82 and resides on the rear side with respect to the first auxiliary roller 47. The trailing end of the piece of recording paper 55 in this state may not necessarily be positioned immediately on the rear side of the first auxiliary roller 47, and may be at any other point between the first auxiliary roller 47 and the second auxiliary roller 48, preferably, at a point between the first auxiliary roller 47 and the downstream end 16 of the lower guide member 82.

When the control unit 90 causes the conveyance motor 71 to rotate in the reverse direction, the trailing end (the leading end in back-side recording) of the piece of recording paper 55 slides along the guide-support surface 84 of the lower guide member 82. The trailing end of the piece of recording paper 55 is brought into contact with the stepped portions 86 (see FIG. 3) positioned in the guide-support surface 84, thereby being prevented from moving toward the upstream side. In this state, the third conveyance roller 45 conveys the piece of recording paper 55 in the reverse direction toward the upstream side. Thus, the piece of recording paper 55 is conveyed in the reverse direction by a predetermined length (the reverse-conveyance length H) (step S13). The reverse-conveyance length 11 is determined in accordance with the encoded amount indicated by the rotary encoder 97. With the reverse conveyance of the piece of recording paper 55, referring now to FIG. 9D, the piece of recording paper 55 is forcibly bent and curled so as to project on the back side (the side opposite the front side 56) thereof.

Figure 9E:
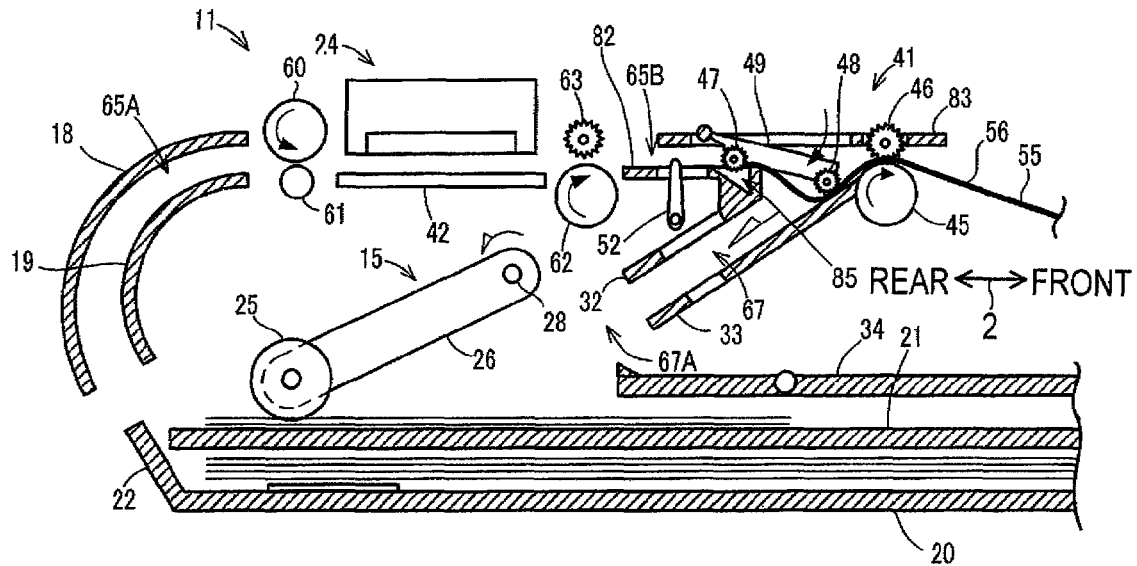
Figure 9F:
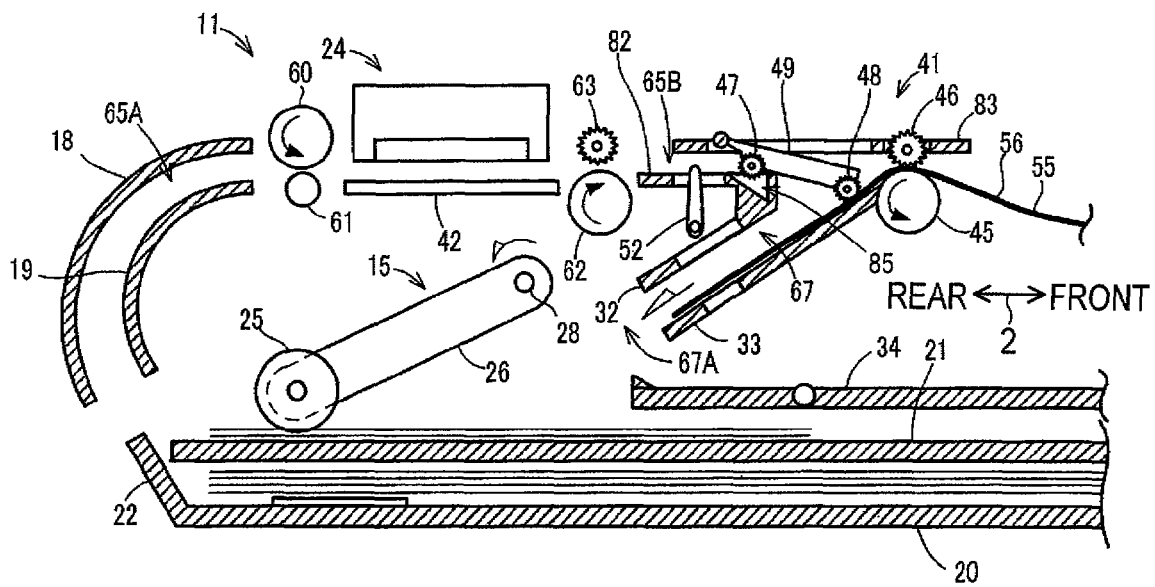
Figure 9G:
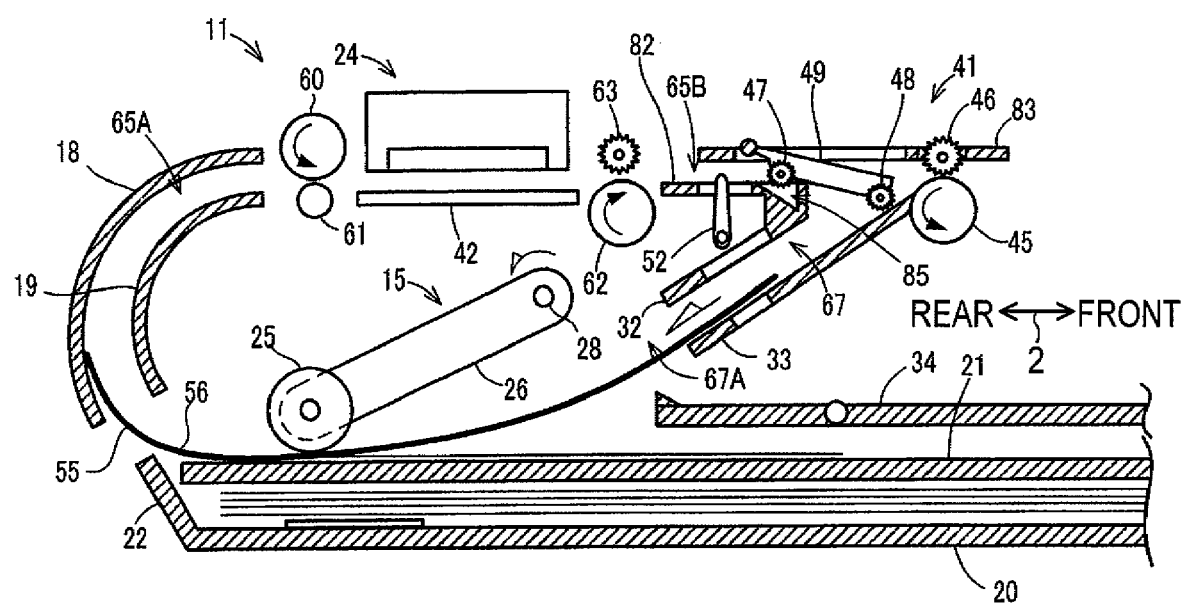

Subsequently, the control unit 90 causes the conveyance motor 71 to rotate in the normal direction, whereby the piece of recording paper 55 is conveyed toward the downstream side by a predetermined length (a length K), as in FIG. 9E (step S14). The length K is set to be larger than the reverse-conveyance length H. Thus, the trailing end of the piece of recording paper 55 is released from the lower guide member 82. At the same time, the flap 49 returns to the first position. Therefore, the piece of recording paper 55 is pressed by the second auxiliary roller 48 and enters the reverse-conveying path 67 through the branch port 36. Subsequently, the control unit 90 causes the conveyance motor 71 to rotate in the reverse direction again, whereby the piece of recording paper 55 is conveyed into the conveying path 65 along the reverse-conveying path 67 with the trailing end thereof being the leading end, as in FIGS. 9F and 9G (step S15). That is, the piece of recording paper 55 is switched back and is conveyed along the reverse-conveying path 67.

By conveying the piece of recording paper 55 along the curved path 65A, the piece of recording paper 55 is turned over before reaching the recording unit 24. In this state, the back side of the piece of recording paper 55 faces the recording unit 24. The recording unit 24 records an image onto the back side of the piece of recording paper 55 (step S16). When the recording of the image onto the back side of the piece of recording paper 55 is finished (step S17), the piece of recording paper 55 is conveyed toward the downstream side while being supported by the lower guide member 82. The piece of recording paper 55 causes the flap 49 to turn from the first position to the second position, as described above, and is discharged to the discharged-paper receiver 79 by the third conveyance roller 45 (step S18). Thus, the image recording operation ends (step S21).

When two-sided printing is started, the necessity of performing steps S5 to S14 (the reverse-conveyance process for preventing jams) is checked in accordance with the type and size of the piece of recording paper 55 in step S4 (see FIGS. 8A and 8B). If it is determined that steps S5 to S14 is unnecessary (if NO in step S4), the reverse-conveyance length H is set to zero (step S19), and the discharge-conveyance length F is determined in accordance with this reverse-conveyance length H (step S20). That is, steps S5 to S14 are substantially omitted.

[Advantages of the Embodiment]

In the multifunction device 10 according to the present embodiment, a piece of recording paper 55 having an image recorded on the front side 56 thereof is bent and curled so as to project on the back side thereof. This prevents the trailing end (the leading end in back-side recording) of the piece of recording paper 55 that has been returned into the conveying path 65 and is conveyed to the recording unit 24 from curling toward the recording unit 24. Thus, good image recording is realized.

In the multifunction device 10 according to the present embodiment, the trailing end (the leading end in back-side recording) of a piece of recording paper 55 is curled. When this curling is performed, the trailing end of the piece of recording paper 55 is brought into contact with the stepped portions 86 (see FIG. 3) of the lower guide member 82. This assuredly stops the movement of the trailing end of the piece of recording paper 55 that is being conveyed in the reverse direction. Therefore, even if the piece of recording paper 55 has a high stiffness, the piece of recording paper 55 is assuredly bent.

Since the roller members of the first auxiliary roller 47 are each positioned in the form of a spur, even in the case where an image is recorded by an inkjet method, the recorded surface is prevented from being damaged. Furthermore, since the recesses 85 are positioned in a comb-like arrangement so as to receive the respective roller members of the first auxiliary roller 47, a piece of recording paper 55 is advantageously guided while being assuredly supported by the guide-support surface 84 of the lower guide member 82.

The stepped portions 86 may be omitted. In that case, the trailing end of a piece of recording paper 55 that is conveyed in the reverse direction by the reverse-conveyance length H in step S13 (see FIGS. 8A and 8B) comes into contact with the first auxiliary roller 47. In this state, the third conveyance roller 45 conveys the piece of recording paper 55 in the reverse direction toward the upstream side, whereby the piece of recording paper 55 is forcibly bent and curled so as to project on the back side (the side opposite to the front side 56) thereof as in FIG. 9D.

In addition, as described above, the recesses 85 may be lengthened toward the downstream side so as to reach the downstream end 16 of the lower guide member 82. In that case, when the flap 49 is in the first position, the first auxiliary roller 47 is positioned at the downstream end 16 of the lower guide member 82. Accordingly, when a piece of recording paper 55 is conveyed in the reverse direction in step S13 (see FIGS. 8A and 8B), the trailing end of the piece of recording paper 55 comes into contact with the first auxiliary roller 47 in a simply supported state. That is, with the trailing end of the piece of recording paper 55 acting as a supported end, the piece of recording paper 55 is significantly bent. In other words, as in FIG. 9D, the entirety of the piece of recording paper 55 is significantly bent downward, with the trailing end of the piece of recording paper 55 not being bent by the downstream end 16 of the lower guide member 82, and is assuredly curled.

Moreover, in this embodiment, two-sided printing is performed by performing steps S1 to S21, but one-sided printing member may be performed by performing steps S1 to S13 and then performing step S18. In this case, deformation occurring during image recording onto a first side of the recording paper can be offset, and recording paper can be reshaped to be discharged.

What is claimed is:

1. A feeding device comprising:
   a conveying roller configured to selectively rotate in a forward direction and a reverse direction, the conveying roller configured selectively to convey a sheet toward a downstream side in a conveying direction when the conveying roller is rotated in the forward direction, and to convey the sheet in a reverse conveying direction opposite the conveying direction when the conveying roller is rotated in the reverse direction;
   a particular guide member positioned on an upstream side of the conveying roller in the conveying direction and configured to guide the conveyed sheet toward the conveying roller, the particular guide member comprising a stopper configured to contact an end portion of the sheet when the sheet is conveyed in the reverse conveying direction by the reverse rotation of the conveying roller, thereby stopping movement of the sheet in the reverse conveying direction when the end portion of the sheet contacts the stopper; and
   a control unit configured to control the conveying roller to execute:
     a first forwarding rotation in which the conveying roller is rotated in the forward direction, such that the sheet is conveyed in the conveying direction to a predetermined position;
     a first reversing rotation in which the conveying roller is rotated in the reverse direction after the sheet has been conveyed to the predetermined position by the first forwarding rotation, such that the sheet is conveyed a predetermined amount in the reverse conveying direction, wherein the end portion of the sheet contacts the stopper while executing the first reversing rotation; and
     a second forwarding rotation in which after the first reversing rotation, the conveying roller is rotated in the forward direction again, such that the sheet is conveyed toward the conveying roller,
   wherein the control unit is configured to control the conveying roller, such that the sheet is nipped by the conveying roller without being released from the conveying roller from an end of the first forwarding rotation to a beginning of the second forwarding rotation.

2. The feeding device according to claim 1, further comprising a movable member configured to move between a first position and a second position, wherein the movable member is in the first position when the conveying roller rotates the first time in the forward direction, and the movable member is in the second position when the conveying roller rotates in the reverse direction.

3. The feeding device according to claim 1, wherein the stopper comprises a stepped portion configured to be contacted by the end of the sheet.

4. The feeding device according to claim 1, further comprising an accommodating portion positioned below the conveying roller, wherein while the first reversing rotation is executed, at least a portion of the sheet is curled, and the accommodating portion is configured to accommodate the curled portion of the sheet.

5. The feeding device according to claim 1, wherein a trailing end of the sheet is held by the particular guide member in the predetermined position.

6. A feeding device comprising:
   a conveying roller configured to selectively rotate in a forward direction and a reverse direction, the conveying roller configured selectively to convey a sheet toward a downstream side in a conveying direction when the conveying roller is rotated in the forward direction, and to convey the sheet in a reverse conveying direction opposite the conveying direction when the conveying roller is rotated in the reverse direction;
   a particular guide member positioned on an upstream side of the conveying roller in the conveying direction and configured to guide the conveyed sheet toward the conveying roller, the particular guide member comprising a stopper configured to contact an end portion of the sheet when the sheet is conveyed in the reverse conveying direction by the reverse rotation of the conveying roller, thereby stopping movement of the sheet in the reverse conveying direction when the end portion of the sheet contacts the stopper;
   a further guide member; and
   a control unit configured to control the conveying roller to:
     rotate the conveying roller in the forward direction, such that the sheet is conveyed in the conveying direction to a predetermined position;
     rotate the conveying roller in the reverse direction, after the sheet has been conveyed to the predetermined position, such that the sheet is conveyed a predetermined amount in the reverse conveying direction, wherein the end portion of the sheet contacts the stopper while the conveying roller rotates in the reverse direction;
     after rotating the conveying roller in the forward direction and in the reverse direction, again rotate the conveying roller in the forward direction, such that the sheet is conveyed toward the conveying roller; and
     after subsequently rotating the conveying roller in the forward direction, again rotate the conveying roller in the reverse direction, such that the sheet is conveyed toward the further guide member.

7. The feeding device according to claim 6, wherein the further guide member extends downward from the conveying roller and is configured to guide the conveyed sheet downward from the conveying roller.

8. The feeding device according to claim 7, wherein the rotating member transitions to the first supported state as the conveyed sheet contacts the rotating member.

9. The feeding device according to claim 6, wherein the particular guide member comprises a rotating member configured to rotate about a support shaft positioned on the upstream side in the conveying direction, wherein the rotating member rotates about the support shaft between a first supported state and a second supported state, wherein the rotating member is further away from the further guide member in the second state than when the rotating member is in the first supported state, and wherein the rotating member is in the first supported state when the conveying roller first rotates in the forward direction, and the rotating member is in the second supported state when the conveying roller first rotates in the reverse direction.

10. The feeding device according to claim 9, wherein the rotating member is configured to exert a pressing force that presses a trailing end of the sheet toward the further guide member, and wherein the pressing force is smaller than a reaction force exerted by the sheet supported by the particular guide member and is larger than a reaction force exerted by the sheet whose trailing end has passed through the particular guide member.

11. The feeding device according to claim 10, wherein the pressing force is related to a weight of the rotating member.

12. The feeding device according to claim 9, wherein the rotating member comprises:
a protruding portion configured to contact the sheet when the rotating member is in the first supported state; and
a pressing portion configured to press the sheet toward the further guide member when the rotating member is in the second supported state.

13. The feeding device according to claim 12, wherein the protruding portion comprises a roller.

14. The feeding device according to claim 13, wherein the roller has a spur shape.

15. The feeding device according to claim 12, wherein the pressing portion comprises a roller.

16. The feeding device according to claim 15, wherein the roller has a spur shape.

17. The feeding device according to claim 9, wherein a recess is formed in the particular guide member at an end of the downstream side of the particular guide member, and wherein at least a portion of the rotating member is positioned in the recess when the rotating member is in the second supported state.

18. The feeding device according to claim 9, wherein the rotating member has a flap shape and configuration.

19. An image recording apparatus comprising:
a recording unit configured to record an image on a recording medium; and
a feeding device comprising:
a conveying roller configured to selectively rotate in a forward direction and a reverse direction, the conveying roller configured selectively to convey a sheet toward a downstream side in a conveying direction when the conveying roller is rotated in the forward direction, and to convey the sheet in a reverse conveying direction opposite the conveying direction when the conveying roller is rotated in the reverse direction;
a particular guide member positioned on an upstream side of the conveying roller in the conveying direction and configured to guide the conveyed sheet toward the conveying roller, the particular guide member comprising a stopper configured to contact an end portion of the sheet when the sheet is conveyed in the reverse conveying direction by the reverse rotation of the conveying roller, thereby stopping movement of the sheet in the reverse conveying direction when the end portion of the sheet contacts the stopper; and
a control unit configured to control the conveying roller to execute:
a first forwarding rotation in which the conveying roller is rotated in the forward direction, such that the sheet is conveyed in the conveying direction to a predetermined position;
a first reversing rotation in which the conveying roller is rotated in the reverse direction after the sheet has been conveyed to the predetermined position by the first forwarding rotation, such that the sheet is conveyed a predetermined amount in the reverse conveying direction, wherein the end portion of the sheet contacts the stopper while executing the first reversing rotation; and
a second forwarding rotation in which after the first reversing rotation, the conveying roller is rotated in the forward direction again, such that the sheet is conveyed toward the conveying roller,
wherein the control unit is configured to control the conveying roller, such that the sheet is nipped by the conveying roller without being released from the conveying roller from an end of the first forwarding rotation to a beginning of the second forwarding rotation.

* * * * *